United States Patent
Fenton et al.

(10) Patent No.: US 7,437,558 B2
(45) Date of Patent: Oct. 14, 2008

(54) METHOD AND SYSTEM FOR VERIFYING IDENTIFICATION OF AN ELECTRONIC MAIL MESSAGE

(75) Inventors: James L. Fenton, Los Altos, CA (US); Michael A. Thomas, San Francisco, CA (US); Frederick J Baker, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 10/859,402

(22) Filed: Jun. 1, 2004

(65) Prior Publication Data
US 2006/0031315 A1 Feb. 9, 2006

(51) Int. Cl.
*H04L 9/00* (2006.01)

(52) U.S. Cl. .................. 713/170; 380/30; 713/156; 713/176

(58) Field of Classification Search ............ 380/30; 709/206; 713/156, 176, 170
See application file for complete search history.

(56) References Cited

U.S. PATENT DOCUMENTS

| | | | | |
|---|---|---|---|---|
| 6,073,242 | A * | 6/2000 | Hardy et al. | 713/155 |
| 6,292,897 | B1 * | 9/2001 | Gennaro et al. | 713/156 |
| 6,567,913 | B1 * | 5/2003 | Ryan, Jr. | 713/156 |
| 6,584,564 | B2 * | 6/2003 | Olkin et al. | 713/152 |
| 6,760,752 | B1 * | 7/2004 | Liu et al. | 709/206 |
| 6,986,037 | B1 * | 1/2006 | Assmann | 713/155 |
| 7,065,547 | B2 * | 6/2006 | Persels et al. | 713/160 |
| 7,127,606 | B2 * | 10/2006 | Wheeler et al. | 713/156 |
| 2002/0032853 | A1 * | 3/2002 | Preston et al. | 713/151 |
| 2003/0158961 | A1 * | 8/2003 | Nomura et al. | 709/237 |
| 2005/0055410 | A1 * | 3/2005 | Landsman et al. | 709/206 |
| 2005/0172004 | A1 * | 8/2005 | Fisher | 709/206 |

OTHER PUBLICATIONS

Lentczner, Mark and Meng Weng Wong, "Sender Policy Framework (SPF): A Convention to Describe Hosts Authorized to Send SMTP Traffic," Feb. 2003, www.ietf.org/internet-drafts/draft-mengwong-spf-00.txt.
Microsoft Corporation, "Caller ID for E-Mail: The Next Step to Deterring Spam," Feb. 12, 2004, *Microsoft*.
Microsoft Corporation, "Protecting Domain Names from Spoofing: A Guide for E-Mail Senders," Feb. 20, 2004, *Microsoft*.
Network Working Group, Qualcomm, P. Resnick, ed., "Internet Message Format," Apr. 2001, ftp://ftp.isi.edu/in-notes/rfc2822.txt.

* cited by examiner

*Primary Examiner*—Gilberto Barron, Jr.
*Assistant Examiner*—Laurel Lashley
(74) *Attorney, Agent, or Firm*—Stolowitz Ford Cowger LLP

(57) ABSTRACT

A method and system for verifying identification of an electronic mail message. An electronic mail message including a signature and a key is received, the signature identifying a domain from which the electronic mail message originated and the key for verifying the signature. A key registration server of the domain is accessed to verify the key. The key registration server provides for verifying that a key used to sign an electronic mail message is valid and that the sender is authorized by the domain to send the electronic mail message from the return address.

49 Claims, 4 Drawing Sheets

METHOD AND SYSTEM FOR VERIFYING IDENTIFICATION OF AN ELECTRONIC MAIL MESSAGE

FIELD OF INVENTION

The present invention relates to the field of electronic mail. Specifically, the present invention relates to a method and system for verifying identification of an electronic mail message.

BACKGROUND OF THE INVENTION

The use of electronic mail (email) allows users anywhere in the world to communicate with each other over the Internet. In recent years, Internet users have been subjected to a torrent of unwanted email messages. These unwanted messages generally take two forms: 1) messages originated by "spammers" to send advertising or solicitation, or as part of a confidence scheme, and 2) messages sent automatically by worms and other malicious software (malware) attempting to infect additional systems. In both cases, a large proportion of the messages attempt to disguise their true source to frustrate attempts to shut down the spammer, to disguise the identity of the infected system sending the message, or to support a social-engineering goal.

In an effort to reduce or eliminate the transmission of unwanted email messages, various approaches have been proposed to verify the identity of the return address of an email. However, current return address verification approaches suffer from various drawbacks which affect their implementation and usability. One approach is a path-based approach for attempting to verify the identity of the sender by verifying the Internet Protocol (IP) address of the message source. An email recipient performs a Domain Name System (DNS) query to determine what addresses are used for outgoing mail servers of the domain as listed by the sender (e.g., for the email address joesmith@example.com, example.com is the domain). If the message source is not from an outgoing mail server of the domain, it is determined that the identity of the return address is forged.

However, the path-based approach provides an incomplete solution to identity verification of an email. For example, an authorized third party may send email messages on behalf of a business. The third party may be authorized to send emails as an agent of the business, but not from the business' internal network. Businesses do not want to authorize third parties to send emails from their network, so as to not expose their network to the third parties. Furthermore, professional organizations, alumni associations, and other affinity domains may provide email addresses to users. In both of these cases, a recipient may receive an email supposedly coming from one domain, but the path indicates the email actually came from another domain. The path-based approach would not be able to verify the sender of the email in these cases. Moreover, path-based schemes can only identify a sender down to the domain level, not to the individual senders. In general, path-based identification schemes break some of the common ways email is used, and are not always effective in filtering unwanted email messages.

Signature-based identification schemes are also used to verify the sender of an email. Pretty Good Privacy (PGP) and Secure Multipurpose Internet Mail Extensions (S/MIME) are examples of signature-based identification schemes. In general, signature-based schemes verify a message signature embedded in the message. In order to verify the message signature, a public key is retrieved. However, since there are no limitations to the posting of a public key, it is necessary to verify the public key in order to avoid spoofing. PGP provides a system for having people or organizations other than the sender sign the public key.

One way to verify a public key supported by PGP is by transitive trust. Transitive trust verifies a key by having other people act as trusted introducers by signing the key. These people are either known to the recipient, or known by people known to the recipient. However, due to the large scale of the email system, it is not desirable to limit receipt of emails to degrees of separation necessary to encompass all email users. In other words, transitive trust does not scale adequately to a global email system. The email identification problem is characterized by extreme scalability requirements. There are currently on the order of 30 million domains and a much larger number of individual addresses. It is important to preserve the positive aspects of current email infrastructure, which include the ability for anyone to communicate with anyone else without introduction. This contrasts with PGP's use of trusted introducers to vouch for the authenticity of keys. Key management based on introducers would have difficulty scaling to the large number of addresses in use and retain the degree of connectivity that email provides.

Another way for verifying public keys is by using certificates. A third party authority provides an electronic certificate to the domain. In exchange for monetary compensation, the authority performs some form of due diligence to confirm the domain's identity. However, management of the certificates by the domain can be very complex and time consuming. In particular, certificate revocation may be problematic. For example, if an employee leaves their position and is no longer authorized to send email messages using the domain, it is necessary to revoke the certificate. In this case, since the certifying authority is a third party, it would be necessary to contact the certifying authority to revoke the certificate. Considering the large number of employees at many companies, as well as the organizational management of a certifying authority, it is quite complicated to manage certificates.

SUMMARY OF THE INVENTION

Various embodiments of the present invention, a method for verifying identification of an electronic mail message, are described. In one embodiment, an electronic mail message including a signature and a key identifier is received, the signature identifying a domain from which the electronic mail message originated and the key identifier for verifying the signature. In one embodiment, a domain name system (DNS) lookup may be performed to locate the key registration server based on the signature. In one embodiment, the key identifier is a key. A key registration server of the domain is accessed to verify the key. In one embodiment, a rating service may be accessed to determine a security rating associated with the electronic mail message.

In another embodiment, a system for verifying identification of an electronic mail message is described, wherein the system includes a mail signer, a key registration server, and a mail recipient. The mail signer is operable to transmit an electronic mail message including a signature and a key identifier, wherein the key identifier is for verifying the signature. In one embodiment, the key identifier is a key. The key registration server is operable to register and verify the key. The mail recipient is operable to receive the electronic mail message, verify the signature based on the key, and access the key registration server to verify the key. In one embodiment, the mail recipient may also be operable to perform a domain name system (DNS) lookup to locate the key registration server based on the signature. In one embodiment, the system may also include a rating service operable to determine a security rating associated with the electronic mail message.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
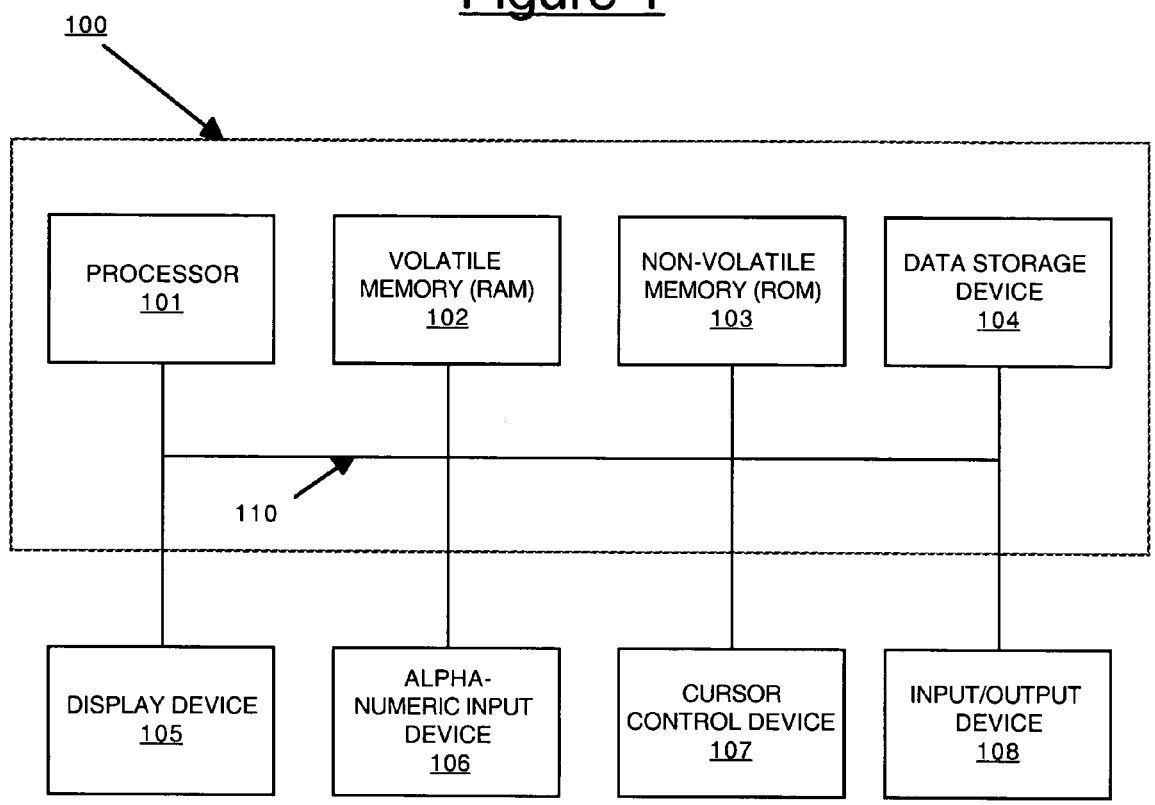
FIG. 1 is a block diagram of an exemplary computer system platform upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method and system for verifying identification of an electronic mail (email) message, are described herein. Embodiments of the present invention provide for receiving an email message including a signature and a key. The signature identifies a domain from which the email message purportedly originated and the key is for verifying the signature. Authorization of the key is verified by accessing a key registration server of the domain. The key registration server provides for verifying that a key used to sign an email message is valid and that the sender is authorized by the domain to send the email message from the return address.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "accessing", "verifying", "generating", "performing", "determining", "signing", "adding", "registering", or the like, refer to the actions and processes of a computer system or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Refer now to FIG. 1 that illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
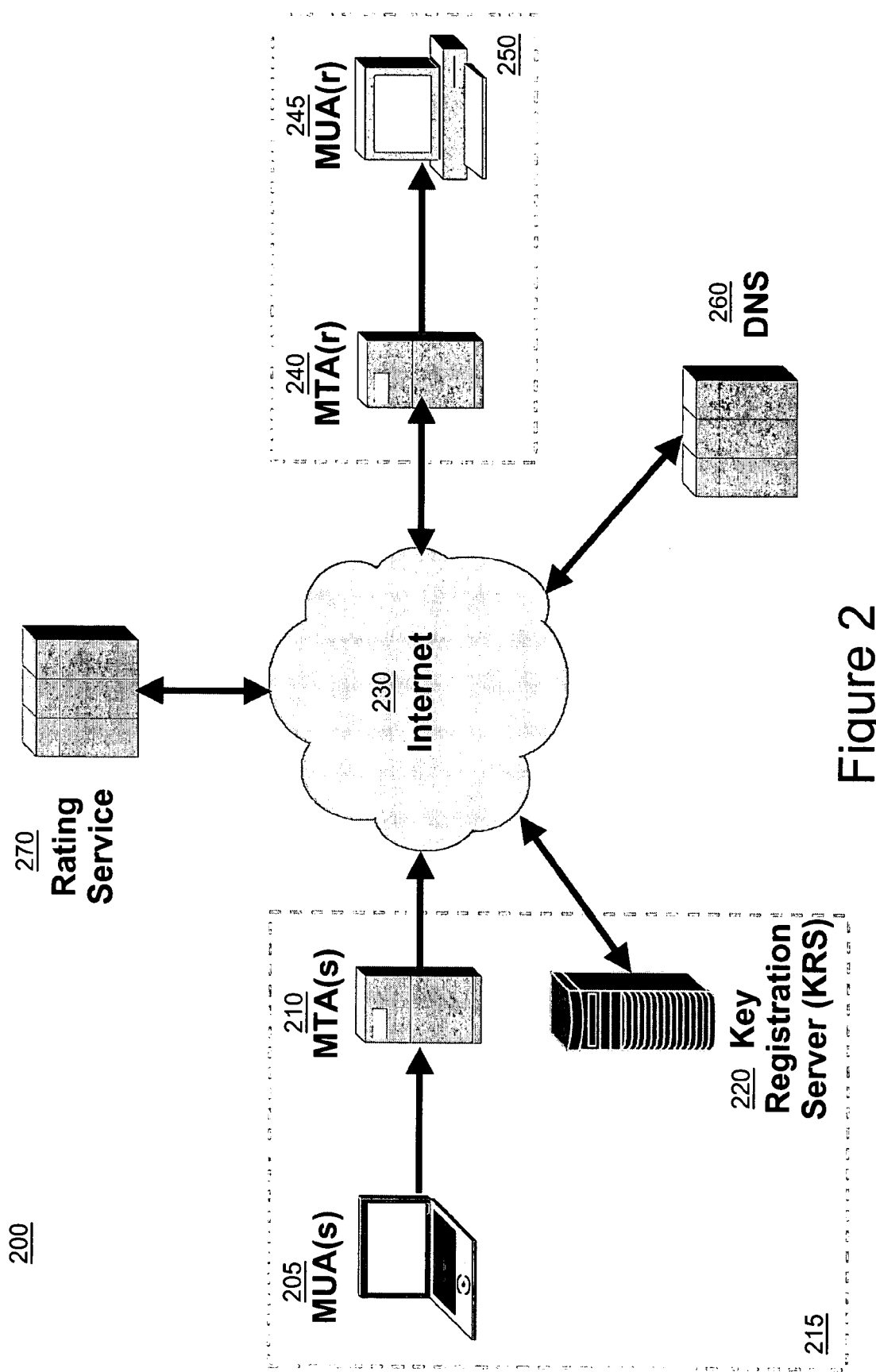
FIG. 2 is a block diagram of one embodiment of a system for verifying identification of an electronic mail message, in accordance with one embodiment of the present invention.

Referring now to FIG. 2, a block diagram of a system 200 for verifying identification of an email message, in accordance with one embodiment of the present invention. As depicted in FIG. 2, system 200 includes mail user agent (MUA) 205, mail transfer agent (MTA) 210, MTA 240, MUA 245, key registration server (KRS) 220, Domain Name System (DNS) 260, and rating service 270. System 200 is operable to perform message transmission for a sender to a receiver. In one embodiment, components of system 200 are operable to perform a method for verifying identification of an email message.

In one embodiment, MUA 205, MTA 210, MTA 240, MUA 245, KRS 220, DNS 260, and rating service 270 are comprised within separate computer systems (e.g., computer system 100 of FIG. 1) dispersed across Internet 230. In one embodiment, the components of system 200 communicate via the communications protocols of system 200. In one embodiment, MUA 205 may communicate to MTA 210 and MTA 210 may communicate to MTA 240 via simple mail transfer protocol (SMTP). In one embodiment, MTA 240 may communicate to KRS 220 and rating service 270 via hypertext transport protocol (HTTP). In one embodiment, MTA 240 may communicate to MUA 245 via post office protocol (POP) or Internet message access protocol (IMAP). It should be appreciated that any protocol that supports communication between computing systems may be used, and that embodiments of the present invention are not limited by the described embodiments.

MUA 205 is an application that supports user interaction with an email system for sending and receiving email messages. In one embodiment, MUA 205 is a software application resident on a computer system. In another embodiment, MUA 205 is a Web-based email application accessible over the Internet. MTA 210 is an application which transmits an email message through a network to a destination mail server. MUA 205 and MTA 210 are associated with domain 215, in which a domain is an organization's unique name on the Internet.

An email message generated at MUA 205 is transmitted by MTA 210 to a destination mail server. Prior to transmission, the email message is signed using a private key of a public/private key pair, wherein the signature is included in the email message header. The signature can be verified by using the public key of the key pair. The public key is also added to the email message header. In one embodiment, MUA 205 is operable to sign the email message and add the public key to the message header. In another embodiment, MTA 210 is operable to sign the email message and add the public key to the message header. By placing the signature generation and public key addition in MTA 210, it is not necessary to initially support this functionality in MUA 205, thereby speeding deployment and reducing technical support demands. However, MUA support may be added to increase email verification flexibility. In another embodiment, a key identifier is added to the message header rather than the entire public key, to reduce the overall size of the email message. The key identifier identifies a public key from KRS 220.

MTA 210 is operable to transmit an email message, which includes a signature and a public key in the message header, to MTA 240. MTA 240 is operable to receive the email message and to verify the authorization of the public key. In order for the signature to be meaningful, a trusted database of public keys needs to be available to verify message signatures. A KRS may be considered authoritative to verify the association of a key with any email address in a domain. Accordingly, KRS 220 associated with domain 215 is accessed to verify the authorization of the public key. In one embodiment, MTA 240 accesses DNS 260 to perform a DNS lookup to locate the address of KRS 220. In one embodiment, the DNS lookup is based on the domain name listed in the return address of the email message (e.g., example.com for the email address joesmith@example.com). In another embodiment, the DNS lookup is based on the domain name listed in the message header.

DNS 260 is operable to return an IP address for the KRS (e.g., KRS 220) associated with the domain name listed in the email address to MTA 240. KRS 220 stores registered keys for domain 215. It should be appreciated that KRS 220 may store registered keys for any number of domains, and is not limited to a single domain. For example, a domain may outsource public key management to a third party KRS. MTA 240 is operable to verify the authorization of the public key received in the email message against registered keys stored in KRS 220.

In one embodiment, KRS 220 determines a value indicating a trust level of the public key according to domain 215. In one embodiment, the value indicates whether a public key is valid (e.g., good rating), a public key is unregistered (e.g., it is unknown), or it is invalid (e.g., public key is associated with a known stolen computer). In one embodiment, the value is based on a key fingerprint (e.g., a cryptographic hash) of the public key. MTA 240 is configured to determine the authorization of the key based on the value. Based on the particular settings of MTA 240, a public key can be determined as valid or invalid. In one embodiment, if the public key is invalid, the email message is dropped.

Even if a key is determined to be valid, the email message may be an unwanted message (e.g., spam or a virus), as senders of unwanted messages may be able to register their own domain. Therefore, it may be desirable to have an independent rating service for rating the security level of a domain and/or a particular user. For example, a domain may be known to have low reliability for preventing unwanted email. In one embodiment, system 200 includes rating service 270 for determining a security rating associated with the sender of the email message. In one embodiment, rating service 270 is a third party service that provides independent ratings of the security provided by a domain and/or individual user address.

MTA 240 is operable to transmit a rating request to rating service 270. In one embodiment, rating service 270 returns a security rating associated with a sender of the electronic mail message. In another embodiment, rating service 270 returns a security rating associated with the domain. It should be appreciated that rating service 270 is optional.

MTA 240 is operable to verify the signature based on the public key. In one embodiment, MTA 240 is also configured to verify the identification of the message based on the signature and the public key. In another embodiment, MTA 240 is also configured to verify the identification of the message based on the signature, the public key and the security rating as received from rating service 270. If the identification of the message is verified, the message is transmitted to MUA 245, for receipt by the intended recipient. In contrast, if the identification of the message is not verified, the message is tagged with the authorization of the identification and, if applicable, the security rating of the sender. In another embodiment, the message may be determined to be an unwanted email message, and is not forwarded to the intended recipient. It should be appreciated that other policies (such as returning a temporary failure until it is convenient to accept an unidentified message) are possible as well. Also, it is possible for MUA 245 to check the authorization (and optionally the security rating) of the message itself.

Figure 3:
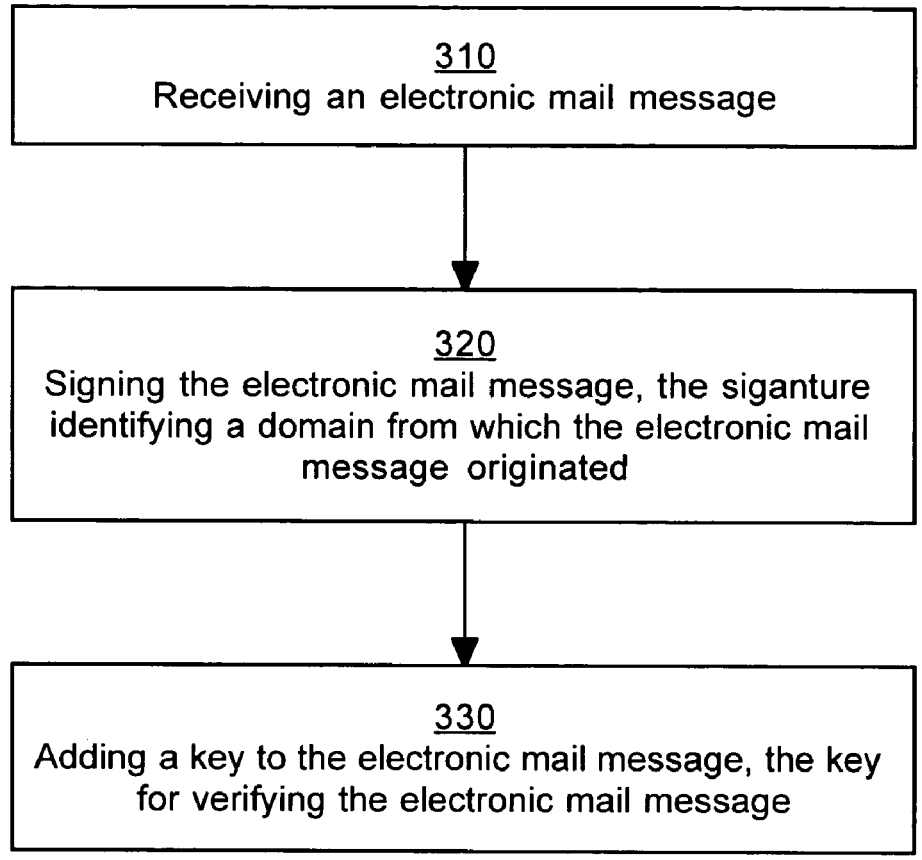
FIG. 3 is a flow chart illustrating a method for generating a self-verifying electronic mail message, in accordance with one embodiment of the present invention.

FIG. 3 is a flow chart illustrating a process 300 for generating a self-verifying electronic mail message, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIG. 3. In one embodiment, process 300 is performed by MUA 205 of FIG. 2. In another embodiment, process 300 is performed by MTA 210 of FIG. 2.

At step 310 of process 300, an email message is received. The email message may be generated at an MUA (e.g., MUA 205 of FIG. 2). At step 320, a signature for the electronic mail message is generated (e.g., the message is signed). The signature is generated using a private key of a public/private key pair. In one embodiment, the signature identifies the domain from which the electronic mail message originated. In one embodiment, the signature is added to a header of the email message.

At step 330, the public key of the key pair is added to the email message, wherein the public key is for verifying the signature. In another embodiment, a key identifier identifying the public key is added to the email message. It should be appreciated that steps 310, 320 and 330 may be performed at either a MTA or a MUA. In one embodiment, the public key is added to a header of the email message. In another embodiment, the public key and signature may be contained within the same email message header.

The signature header including the public key is included in an email message in order for it to be considered a self-verifying mail message. For example, the signature header may have the syntax:

signature="X-IMAIL-SIG:" signature-text CRLF

The signature-text may include a number of fields that represent the signature itself, a public key used to create the signature, and related information. An example of a signature is as follows:

---

X-IMAIL-SIG: v:"1"; h:"thomasm-u1"; d:"cisco.com";
    t:"1080771772.862325"; x:"1081203772"; a:"rsa-sha1"; e:"Iw==";
    n:"pZORwkeEetQnTVC7tw5MIE+31ROt/sGv5q+dxuwUIIqu5XKSva4P1/anPgIiz"
    "7K8V0MaRDwDjKIuYYGaUO5IdDNfE7WEKe+/r8k3D0lrkNCa8qNPDSKljocN6y"
    "d7Wjmx/Hk+tquACcpwhhDyVxzIBcj/A5aCApbeFeRkVvfFH70=";
    s:"T3iRhynnuKx8+UNBuxMnDCIFet8RTM+VAs+STKM4P9ZqiEaUmG1rXmeXq3T+8"
    "OoHhWtztZob/2twTxiqzgMD5MnFOTaqujJUBOmkIf1VR+ELzKq/vPZ+GmWs+h"
    "mtSg3sH7jWrnvYHQpT6yey9TumnJVAdWepPl4budT9GFdpRuw=";
    c:"Subject: new tags"

---

Tags and their values in the X-IMAIL-SIG line are included into the cryptographic hash with the sole exception of the s: (signature) tag and its value. The tags and their values are simply concatenated to each other when forming the cryptographic hash in the order they are present in the X-IMAIL-SIG line. That is: "v1hthomasm-u1dcisco.com[ . . . ]". Syntactic markers are not included and the value used in the hash is before encoding/after decoding. The final hash algorithm is as follows:

TRUNC (SHA1 (SIGTAGVALS, SHA1 (BODY)), 12)

where SIGTAGVALS is the encoding described above for the header tags/values and BODY is the SHA-1 hash of the body of the email itself. In one embodiment, the SHA-1 value of the body uses the full 16 bytes of the hash (e.g., is not truncated). Examples of the tags used in the signature are as follows:

a: Algorithm—One-way hash and public key algorithm. In one embodiment this is rsa-sha1.

c: Copied header—A copied header is a header which the sender would like to cryptographically sign. In one embodiment, there are no other headers into the cryptographic hash. The headers which are copied into the signature line are purely at the discretion and local policy of the signer. In one embodiment, the headers copied include the Subject, From, and Date headers. Receiving MTAs and/or MUAs may choose to replace the unsigned headers with headers which have been signed so as to present untampered with headers to the user, typically the headers copied from the originating domain. If such a replacement is performed, the unsigned headers may be preserved in the message (e.g., X-UNSIGNED-HEADER).

d: Domain of signer—This tag denotes the signing domain. It is used to inform the receiver of the appropriate level of address that is considered the authoritative domain in this context. For example, if a message is received from jdoe@eng.example.com, the d: tag might indicate that the domain is example.com or eng.example.com. If this tag does not correspond to either the hostname of the envelope-from address or a higher-level domain, the signature may be ignored.

e: The Rivest-Shamir-Adelman (RSA) public exponent of the supplied signing key, base 64 encoded.

h: Signing host.

n: The RSA public modulus of the supplied signing key, base 64 encoded. It should be appreciated that the key length is implicit with the number of decoded bits in the modulus. For example, supported key lengths may be 768 bits, 1024 bits and 1536 bits.

s: The RSA signature over the computed one-way hash, base 64 encoded.

t: Timestamp—The time that this signature was created. In one embodiment, the format is the standard Unix seconds-since-1970 followed by a fractional number. In one embodiment, the time stamp is unique for this signing key. The intent of the fraction is to the guarantee the uniqueness of any given signature at any particular instance. The value may be expressed as an unsigned integer.

x: Signature expiration in seconds-since-1970 format—In one embodiment, signatures are not considered valid if the current time at the receiver is past the expiration date. The value may expressed as an unsigned integer.

v: Version of these tags—In one embodiment this is set to "1". The value may expressed as an unsigned integer.

In one embodiment, the email message also includes an optional verification header which is used to convey the verification of a message from an MTA to an MUA or another MTA within the same trust domain. If used, it is applied by an MTA that is close to the point where an MTA or the recipient's MUA applies policy based on the verification status of the message. The verification header indicates whether an MTA was able to successfully verify the message according to whatever policies it decides to use. A recipient MUA or MTA may decide to rely on the presence of a verification header in applying policy to the message (e.g., moving an unverified message to a lower-priority folder), or it may do such verification locally.

In one embodiment, the verification header is not cryptographically protected, in order to avoid the need to manage keys for MTAs. The verification header may be deleted from the header when the message is sent via SMTP outside the trust domain of the sender. In one embodiment, the verification header is discarded if it received from an SMTP peer that is not trusted by the recipient (e.g., an SMTP peer that is not within the recipient's administrative control).

An example of a verification header is as follows:

X-IMAIL-VERIFY: s:"y"; v:"y"; r:"68"; h:"imail.example.com"

Examples of the tags and values used by the verification header are as follows:
- s: Signature—The value is "y" if there is a signature line from the sending domain (e.g., the domain suffix in the envelope from). Otherwise the value is "n".
- v: Verify—The value is "y" if the home domain's signature is both present and the public key operation verifies correctly.
- r: Rating—The value here is between −127 and 127 with negative values expressing an adverse rating, zero being neutral and positive values indicating a favorable rating. The rating value is at the discretion of the entity supplying the X-IMAIL-VERIFY header and may take into account many different factors including the rating supplied by the home domain's KRS, local and third party ratings, and any other factors the verifying entity considers relevant.
- h: Host—This is the fully qualified domain name of the MTA that performed the verification. It should be noted that since the X-IMAIL-VERIFY header is not cryptographically protected, users or subsequent MTAs which make use of the X-IMAIL-VERIFY header independently ensure that it is not subject to tampering.

Figure 4:
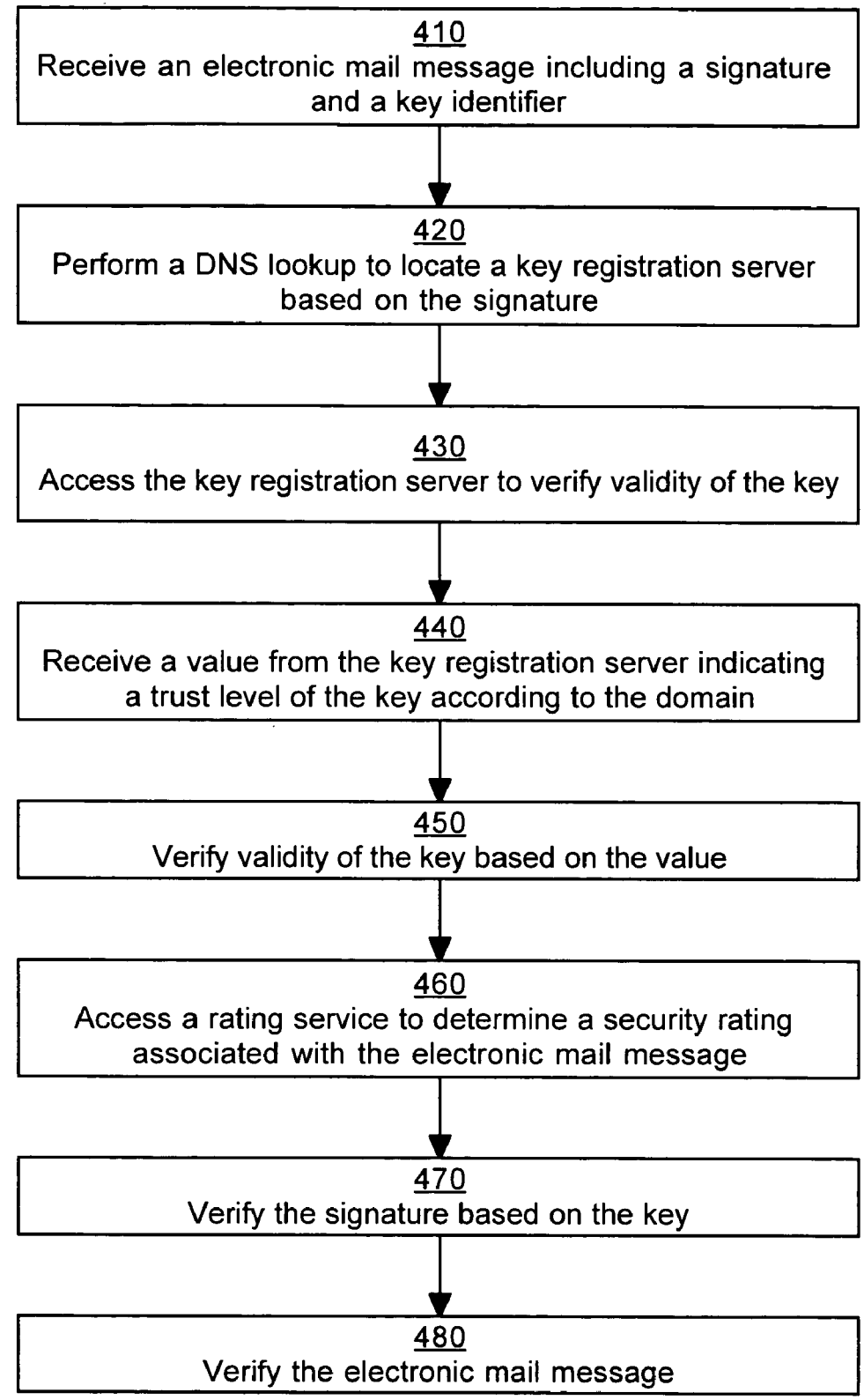
FIG. 4 is a flow chart illustrating a method for verifying identification of an electronic mail message, in accordance with one embodiment of the present invention.

FIG. 4 is a flow chart illustrating a process 400 for verifying identification of an electronic mail message, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 400, such steps are exemplary. That is, the embodiments of the present invention are well suited to performing various other steps or variations of the steps recited in FIG. 4. In one embodiment, process 400 is performed by MTA 240 of FIG. 2.

At step 410 of process 400, an email message comprising a signature and a key identifier is received. The signature identifies a domain from which the email message originated and the key identifier is for verifying the signature. In one embodiment, the key identifier identifies an associated key for verifying the signature. In another embodiment, the key identifier is a key. In one embodiment, the key is a public key that verifies the signature was generated by the same public/private key pair. In one embodiment, the email message is received at an MTA (e.g., MTA 240 of FIG. 2).

At step 420, a DNS lookup is performed to locate the KRS for the domain associated with the email message. The KRS is considered authoritative to verify the association of a key with an email addresses in the domain. In one embodiment, to locate the KRS, the verifying MTA/MUA queries DNS with the hostname part of the envelope-from email address (e.g., eng.example.com for tom@eng.example.com).

The zone file for a given domain might contain records such as the following:

```
example.com. IN MX 10 mail.example.com.
example.com. IN MX 10 mail2.example.com.
_krs._tcp.example.com. IN SRV 10 10 378 krs.example.com.
_krs._tcp.example.com. IN SRV 10 10 378 krs2.example.com.
```

At step 430, a KRS of the domain is accessed to verify authorization of the key. In one embodiment, the key is obtained from the KRS based on the key identifier. In another embodiment, where the key identifier is the key, the KRS confirms or denies the binding between the envelope-from email address used by the message and the key used to sign the message. It does so by receiving a query (e.g., an authorization verification request) including the key fingerprint and the envelope-from email address. In another embodiment, the query includes the envelope without the key. In another embodiment, the query receives the key for verifying authorization of the key.

At step 440, a value is received from the KRS indicating a trust level of the key according to the domain. In one embodiment, the KRS returns a numerical value based on the policy of the sending domain as to whether the key is authorized to be used in sending a message from the specified address. One exemplary policy might be as follows:

+127: Key is recognized and acceptable for the given address

0: Key is unrecognized

−127: Key is known to have been compromised; do not accept it

The outgoing MTA for a domain is most likely to perform rewriting, if any, of the envelope-from address of the message (for example, to remove an unnecessary subdomain). Since the KRS and the outgoing MTA are usually under common administration, the KRS can be configured to respond appropriately to expected rewritings of the envelope-from address. The following are some excerpts from a hypothetical KRS database:

| #Rating | TTL | Address | Key Fingerprint |
|---|---|---|---|
| 100 | 86400 | tom@eng.example.com | 073FDD7DD6D6EF6D1413FD7B3C577EFC<br># Tom's usual address |
| 100 | 86400 | tom@example.com | 073FDD7DD6D6EF6D1413FD7B3C577EFC<br># Rewriting of Tom's address |
| 100 | 86400 | dick@example.com | 91881749E520D8F53B0B91BBD8963D0D<br># Dick's PC |
| 100 | 86400 | dick@example.com | 549D8949351DDA4E7C961E0F58727795<br># Dick's PDA |
| −100 | 864000 | harry@example.com | 8C8252070CA9ED401DD2EE2A7B31A8CF<br># Harry's stolen PC |
| 100 | 86400 | harry@example.com | 17E64AC44DD5F8891560919D3FC6EA52<br># Harry's new PC |
| 100 | 86400 | harry@example.com | 073FDD7DD6D6EF6D1413FD7B3C577EFC<br># Tom is Harry's administrative<br># assistant, so Harry allows Tom<br># to originate mail for him. |
| 100 | 604800 | *@example.com | 27985A61447CC8B514A82BFA4597174A<br># Outgoing MTA key. MTA keys are<br># less likely to require rapid<br># revocation, hence the longer TTL. |
| 100 | 86400 | nobody@example.com | *<br># Any key will work for this address<br># NOT RECOMMENDED! |
| −100 | 86400 | nosig@example.com | <br># No signature with email, where<br># domain signs all emails |

At step 450, the authorization of the key is verified based on the value. Verification of public keys from key registration servers is accomplished via a properly-formatted HTTP request. A sample request might be formatted as follows:

```
http://krs2.example.com:378?domain=example.com
    &name="john@example.com"
    &keyfp="27985A61447CC8B514A82BFA4597174A"
    &service="SMTP"
```

The fields in the query are as follows:

name: The envelope_from of the incoming mail.

keyfp: The public key fingerprint that was supplied in the X-IMAIL-SIG line.

domain: The domain corresponding to the query to be performed. This is used primarily to allow a single KRS to support multiple domains, with each domain database being independently maintained.

service: The service (e.g., SMTP) for which the query is requested.

The KRS response is the tag/value syntax with the following exemplary tags/values defined:

s: status. Follows the general convention of SMTP/HTTP status values (e.g., 200, 300, 400, 500 semantics) with the following values defined:

| | |
|---|---|
| 200: | the lookup succeeded. |
| 201: | the lookup succeeded, but the keyfp/name combination was not found |
| 500: | any permanent failure. | t: Time to live—Responses may be cached on the receiver so as to reduce the query/response load back to the KRS. Time to live is expressed in seconds from when the query was sent.

r: Rating—Similar to rating in the X-IMAIL-VERIFY, an integer between −127 and 127 which as the sole discretion of the entity producing the rating.

For example, revoked keys from the home KRS would be given a negative rating.

m: Matches—Some key fingerprints may in fact sign for more than the single address that is present in the query. In order cut down trips to the KRS, the Matches field describes with normal Unix wildcard syntax what envelope_from patterns match this key fingerprint. For example:

m:"*@example.com"

would inform the cache logic of the requestor that future queries from example.com with this key fingerprint be given the same rating and time to live.

c: Comment—This is a free form string intended to convey a human readable comment about the operation.

v: Version of the responses—The value is expressed as an unsigned integer.

In one embodiment, the KRS uses a mechanism that ensures that only authorized users are able to deposit key fingerprints on the server and revoke them. This may involve a mechanism such as an authenticated HTTP exchange that requires the user's password in order to register a public key fingerprint for that user on the server. It is implicit in this key management approach that only legitimate key-to-address bindings may be registered on the key registration servers. In one embodiment, in order to prevent harvesting of email addresses, a KRS will not respond with any email address other than that presented in the query or a more general address (for example, when the key fingerprint corresponds to a domain MTA).

At step 460, a rating service is accessed to determine a security rating associated with the email message. In one embodiment, the security rating is associated with a sender of the email message. In another embodiment, the security rating is associated with the domain. It should be appreciated that step 460 is optional. It is helpful, but probably not sufficient to confirm that a message was signed using a key authorized for the stated address. This alone says nothing about the security of the originating domain's KRS, the method used to identify message senders prior to MTA message signing, and the overall character of the domain. Senders of unwanted email messages are free to register domains and set up KRSs for those domains. Domains might also be set up with explicitly open key registration policies, to permit anonymous exchange of signed messages among groups of people. In either case, mail from such domains might be less valued than from domains known to be reliable.

The address rating service fulfills the need to distinguish domains with differing registration policies and/or user behavior. In one embodiment, the rating service is a third-party service, somewhat analogous to a credit bureau, which the verifier of an identified mail message may use to obtain a relative evaluation of the sending address based on criteria established by the rating bureau. In one embodiment, the rating service is operable to monitor security, policies, and user behavior of a domain. A hypothetical ratings database might include:

```
90   responsible-isp.com    /* ISP with good security and policies */
40   flaky-isp.com          /* ISP that isn't very responsive */
80   tom@flaky-isp.com      /* Known good user at flaky ISP */
 0   spam-marketing.com     /* Known source of UCE */
```

In one embodiment, entries in the ratings database should be returned on the basis of longest-match. In the example above, the address "tom@flaky-isp.com" should return a rating of 80, not the value of 40 used for all other addresses in the domain. It should be appreciated that other values may be used for providing the security ratings. For example, domains or emails with poor ratings may have negative security ratings, while domains or emails with good ratings may have positive security ratings. It should be appreciated that step 460 is optional.

At step 470, the signature is verified based on the key. At step 480, the identification of the email is verified. In one embodiment, the identification is verified based on the signature and the key. In another embodiment, the identification is verified based on the signature, the key and the security rating.

The described embodiments of the present invention provide a system and method for verifying identification of an email message. By providing a KRS for management of public keys, verification that a key used to sign an electronic mail message is valid and that the sender is authorized by the domain to send the electronic mail message from the return address may be management by a domain administrator. Furthermore, by providing a rating service for rating the security of the originating domain's KRS, a greater level of protection against unwanted email messages.

Various embodiments of the present invention, a system and method for verifying identification of an electronic mail message, are thus described. While the present invention has been described in particular embodiments, it should be appreciated that the present invention should not be construed as limited by such embodiments, but rather construed according to the below claims.

What is claimed is:

1. A method comprising:
   receiving an electronic mail message at a recipient server, the electronic mail message comprising a signature and a key identifier, said signature identifying a domain from which said electronic mail message originated and said key identifier for verifying said signature;
   accessing a domain name system over a network by the recipient server to perform a domain name system (DNS) lookup responsive to receiving the electronic mail message at the recipient server, the DNS lookup to locate a key registration server associated with the domain;
   accessing, by the recipient server, said key registration server over the network responsive to receiving the electronic mail message at the recipient server, the key registration server to verify an association of said key identifier with the domain in the signature of the received electronic mail message; and
   receiving, at the recipient server, a security rating associated with the domain or sender of the received electronic mail message from a rating service, where the security rating is based on at least one of registration policies associated with the domain, domain security, or behavioral information associated with the sender of the electronic mail message.

2. The method as recited in claim 1 further comprising receiving a key from said key registration server based on said key identifier; and
   in response to said receiving said key, verifying said authorization of said key.

3. The method as recited in claim 1 wherein said key identifier is a key.

4. The method as recited in claim 3 further comprising:
   receiving a value from said key registration server indicating a trust level of said key according to said domain; and
   verifying said authorization of said key based on said value.

5. The method as recited in claim 4 wherein said value is based on a key fingerprint of said key.

6. The method as recited in claim 1, wherein said security rating is associated with a sender of said electronic mail message.

7. The method as recited in claim 1, wherein said security rating is associated with said domain.

8. The method as recited in claim 1 further comprising verifying said signature based on said key.

9. The method as recited in claim 1 further comprising verifying said identification of said electronic mail message based on said signature and said key.

10. The method as recited in claim 1 further comprising verifying said identification of said electronic mail message based on said signature, said key and said security rating.

11. A system comprising:
    a mail signer for transmitting an electronic mail message, said electronic mail message comprising a signature and a key identifier, said signature identifying a domain from which said electronic mail message originated and said key identifier for verifying said signature;
    a key registration server for registering a key; and
    a mail verifier for receiving said electronic mail message generated independently of a public key associated with the mail verifier, for verifying said signature based on said key identifier, for accessing a domain name system over a network to perform a domain name system (DNS) lookup responsive to receiving the electronic mail message from the mail signer, the DNS lookup to locate said key registration server, and for accessing said key registration server over the network responsive to receiving the electronic mail message from the mail signer, the key registration server to verify an association of said key identifier with the domain in the signature of the received electronic mail message.

12. The system as recited in claim 11 wherein said mail signer is a mail transfer agent.

13. The system as recited in claim 11 wherein said mail signer is a mail user agent.

14. The system as recited in claim 11 wherein said mail verifier is a mail transfer agent.

15. The system as recited in claim 11 wherein said mail verifier is a mail user agent.

16. The system as recited in claim 11 wherein said mail verifier is also for receiving said key from said key registration server based on said key identifier, and verifying said authorization of said key in response to said receiving said key.

17. The system as recited in claim 11 wherein said key identifier is a key.

18. The system as recited in claim 17 wherein said key registration server is also for determining a value indicating a trust level of said key according to said domain.

19. The system as recited in claim 18 wherein said value is based on a key fingerprint of said key.

20. The system as recited in claim 11 further comprising a rating service for determining a security rating associated with said electronic mail message.

21. The system as recited in claim 20, wherein said security rating is associated with a sender of said electronic mail message.

22. The system as recited in claim 20, wherein said security rating is associated with said domain.

23. The system as recited in claim 11 wherein said mail verifier is also for verifying said signature based on said key.

24. The system as recited in claim 11 wherein said mail verifier is also for verifying said identification of said electronic mail message based on said signature and said key.

25. The system as recited in claim 20 wherein said mail verifier is also for verifying said identification of said electronic mail message based on said signature, said key and said security rating.

26. An electronic device comprising:
a bus;
a computer-readable memory coupled to said bus; and
a processor coupled to said bus, said processor for:
receiving an electronic mail message at a recipient server, the electronic mail message comprising a signature and a key identifier, said signature identifying a domain from which said electronic mail message originated and said key identifier for verifying said signature;
accessing a domain name system over a network by the recipient server to perform a domain name system (DNS) lookup responsive to receiving the electronic mail message at the recipient server, the DNS lookup to locate a key registration server associated with the domain;
accessing, by the recipient server, said key registration server over the network responsive to receiving the electronic mail message at the recipient server, the key registration server to verify an association of said key identifier with the domain in the signature of the received electronic mail message; and
tagging the electronic mail message with verification results associated with the authorization of the key.

27. The electronic device as recited in claim 26 wherein said method further comprises:
receiving a value from said key registration server indicating a trust level of said key according to said domain; and
verifying said authorization of said key based on said value.

28. The electronic device as recited in claim 27 wherein said value is based on a key fingerprint of said key.

29. The electronic device as recited in claim 26 wherein said method further comprises accessing a rating service to determine a security rating associated with said electronic mail message.

30. The electronic device as recited in claim 29, wherein said security rating is associated with a sender of said electronic mail message.

31. The electronic device as recited in claim 29, wherein said security rating is associated with said domain.

32. The electronic device as recited in claim 26 wherein said method further comprises verifying said signature based on said key.

33. The electronic device as recited in claim 26 wherein said method further comprises verifying said identification of said electronic mail message based on said signature and said key.

34. The electronic device as recited in claim 29 wherein said method further comprises verifying said identification of said electronic mail message based on said signature, said key and said security rating.

35. A system for verifying identification of an electronic mail message, said system comprising:
means for transmitting an electronic mail message, said electronic mail message comprising a signature and a key, said signature identifying a domain from which said electronic mail message originated and said key for verifying said signature;
means for registering said key; and
means for receiving said electronic mail message generated independently of a public key associated with the means for receiving, for verifying said signature based on said key, for accessing a domain name system over a network to perform a domain name system (DNS) lookup responsive to receiving the electronic mail message, the DNS lookup to locate said means for registering said key, and for accessing said means for registering said key over the network responsive to receiving the electronic mail message, the means for registering said key to verify an association of said key with the domain in the signature of the received electronic mail message.

36. The system as recited in claim 35 wherein said means for registering said key is also operable to determine a value indicating a trust level of said key according to said domain.

37. The system as recited in claim 35 further comprising a means for determining a security rating associated with said electronic mail message.

38. A method comprising:
monitoring a domain for at least one of domain security at a ratings service, registration policies associated with the domain, and user-behavior associated with the domain;
receiving, at the ratings service, a security rating request associated with an electronic mail message originating from the domain, the security rating request received from a recipient of the electronic mail message over a network;
determining, at the ratings service, a security rating associated with said electronic mail message based on said monitoring; and
transmitting, from the ratings service, a response comprising said security rating to the recipient of the electronic mail message over the network.

39. The method as recited in claim 38 wherein said security rating is associated with a sender of said electronic mail message.

40. The method as recited in claim 38 wherein said security rating is associated with said domain.

41. A computer-usable medium having computer-readable program code embodied therein for causing a computer system to perform a method for determining a security rating, said method comprising:

- monitoring a domain for at least one of domain security at a ratings service, registration policies associated with the domain, and user-behavior associated with the domain;
- receiving, at the ratings service, a security rating request associated with an electronic mail message originating from the domain, the security rating request received from a recipient of the electronic mail message over a network;
- determining, at the ratings service, a security rating associated with said electronic mail message based on said monitoring; and
- transmitting, from the ratings service, a response comprising said security rating to the recipient of the electronic mail message over the network.

42. The computer-usable medium as recited in claim 41 wherein said security rating is associated with a sender of said electronic mail message.

43. The computer-usable medium as recited in claim 41 wherein said security rating is associated with said domain.

44. An electronic device comprising:

- a bus;
- a computer-readable memory coupled to said bus; and
- a processor coupled to said bus, said processor for:
- monitoring a domain for at least one of domain security at a ratings service, registration policies associated with the domain, and user-behavior associated with the domain;
- receiving, at the ratings service, a security rating request associated with an electronic mail message originating from the domain, the security rating request received from a recipient of the electronic mail message over a network;
- determining, at the ratings service, a security rating associated with said electronic mail message based on said monitoring; and
- transmitting, from the ratings service, a response comprising said security rating to the recipient of the electronic mail message over the network.

45. The electronic device as recited in claim 44 wherein said security rating is associated with a sender of said electronic mail message.

46. The electronic device as recited in claim 44 wherein said security rating is associated with said domain.

47. A system for determining a security rating, said system comprising:

- means for monitoring a domain for at least one of domain security at a ratings service, registration policies associated with the domain, and user-behavior associated with the domain;
- means for receiving, at the ratings service, a security rating request associated with an electronic mail message originating from the domain, the security rating request received from a recipient of the electronic mail message over a network;
- means for determining, at the ratings service, a security rating associated with said electronic mail message based on said monitoring; and
- means for transmitting, from the ratings service, a response comprising said security rating to the recipient of the electronic mail message over the network.

48. The system as recited in claim 47 wherein said security rating is associated with a sender of said electronic mail message.

49. The system as recited in claim 47 wherein said security rating is associated with said domain.

\* \* \* \* \*